(12) United States Patent
Pellizzer et al.

(10) Patent No.: US 10,791,095 B2
(45) Date of Patent: Sep. 29, 2020

(54) SECURE AUTHENTICATION AND DATA TRANSFER FOR CLOUD SYSTEMS

(71) Applicant: AuthMeIn, LLC, Las Vegas, NV (US)

(72) Inventors: Guido Pellizzer, Lovere (IT); Federico Simonetti, San Jose, CA (US)

(73) Assignee: Xiid Corporation

( * ) Notice: Subject to any disclaimer, the term of this patent is extended or adjusted under 35 U.S.C. 154(b) by 195 days.

(21) Appl. No.: 15/727,454

(22) Filed: Oct. 6, 2017

(65) Prior Publication Data

US 2018/0255021 A1 Sep. 6, 2018

Related U.S. Application Data

(60) Provisional application No. 62/465,662, filed on Mar. 1, 2017.

(51) Int. Cl.
*H04L 29/06* (2006.01)
*G06F 21/62* (2013.01)
*G06F 21/60* (2013.01)

(52) U.S. Cl.
CPC .......... *H04L 63/029* (2013.01); *G06F 21/606* (2013.01); *G06F 21/62* (2013.01); *H04L 63/04* (2013.01); *H04L 63/0428* (2013.01); *H04L 63/08* (2013.01); *H04L 63/20* (2013.01)

(58) Field of Classification Search
CPC ... H04L 63/029; H04L 63/04; H04L 63/0428; H04L 63/08; H04L 63/20; G06F 21/606; G06F 21/62
See application file for complete search history.

(56) References Cited

U.S. PATENT DOCUMENTS

| | | | |
|---|---|---|---|
| 2008/0301794 A1* | 12/2008 | Lee ..................... | H04L 63/0281 726/11 |
| 2015/0046985 A1* | 2/2015 | D'Souza ................ | H04L 63/08 726/4 |
| 2015/0326579 A1* | 11/2015 | Chandwani ............ | H04L 63/10 709/225 |
| 2017/0111336 A1* | 4/2017 | Davis ..................... | H04L 67/02 |

* cited by examiner

*Primary Examiner* — Shin-Hon (Eric) Chen
*Assistant Examiner* — Jessica J South
(74) *Attorney, Agent, or Firm* — Jordan Powell

(57) ABSTRACT

A user may access resources within a secure network through an agent stored on a first computing device within the secure network which then opens an outbound secure channel through a firewall of the secure network to a request collector stored on a second computing device outside the secure network. The agent waits until the request collector has rendered available on the outbound secure channel a request from the user for access to the resources in the secure network. The agent then reads the request rendered available on the outbound secure channel by the request collector and causes the request to be executed utilizing the resources within the secure network. The agent responds back to the request collector on the outbound secure channel which then responds to the user.

20 Claims, 11 Drawing Sheets

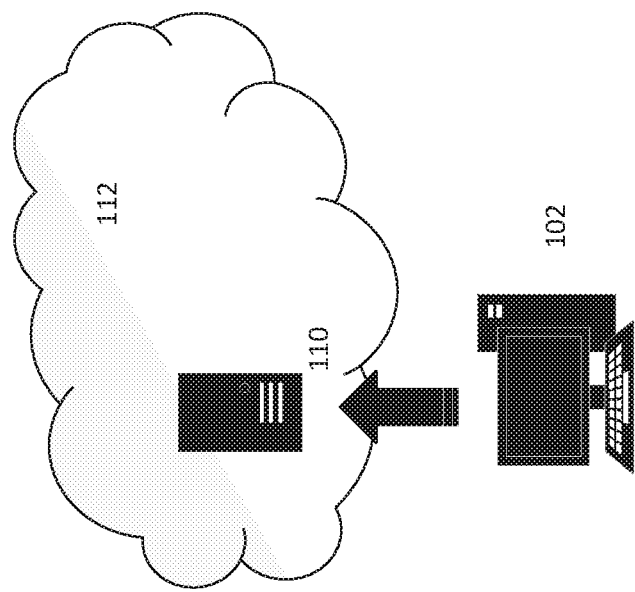
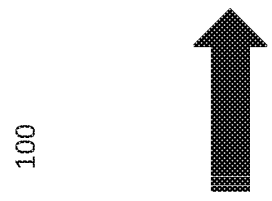
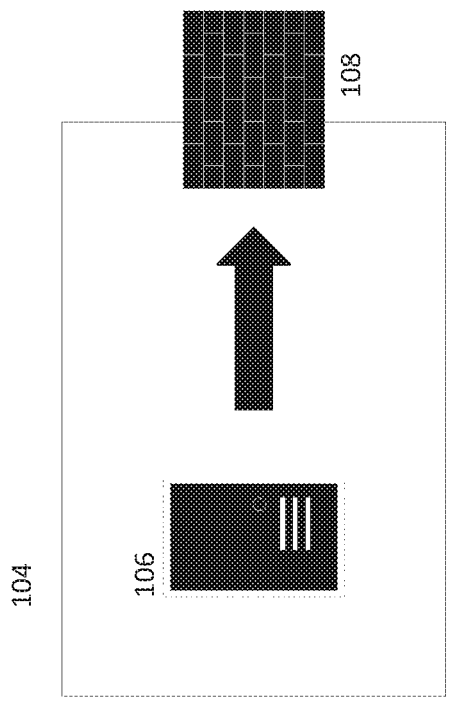
Fig 1
Prior Art

SECURE AUTHENTICATION AND DATA TRANSFER FOR CLOUD SYSTEMS

CROSS-REFERENCE TO RELATED APPLICATIONS

This application claims priority from U.S. Provisional Patent Application 62/465,662 filed Mar. 1, 2017, which is incorporated herein by reference.

BACKGROUND

This invention relates to Cloud computing and in particular to securely access of data and information residing on a computer or other digital device located inside a firewall-protected network from another computer located outside such firewall-protected network (such as Internet, Cloud, a different private network, etc.).

Cloud computing is growing and is used by individuals and companies. Entities are looking to the Cloud for the ability to store data, share data with other users, run applications, host virtual machines, and perform a wide range of IT tasks. Corporate and government entities desire to grant their people the ability to authenticate on authentication servers that are within the corporate firewall when they are outside that firewall. Those same entities further desire their people to access, from outside the firewall, data and/or operations on computers within the corporate firewall.

A major concern with using the Cloud to authenticate users, access data and access internal computer operations is the problem with security. For instance, when an employee is outside the corporate firewall and needs to authenticate on authentication servers that reside within the firewall, the authentication request will normally tunnel through the firewall. When utilizing the Cloud, this tunneling opens the possibility that hackers breaking into the Cloud servers may be able to further gain access to the corporate network behind the firewall. They may also use the open ports on the firewall, ports that feature inbound NAT or port forwarding rules, to break into the corporate network directly, even without passing through the Cloud servers.

A key element to allowing an outside user access from the Cloud to the network behind the firewall is authentication. Entities have many varying software tools allowing their employees to perform their work in an appropriate manner. With the advent of the Cloud, the employees utilize these tools from a source other than their own personal computers or mobile devices. Often these software tools are stored on the Cloud, and the potential user will need to authenticate him/herself in order to use the tools.

The problem with authentication is a difficult one. To date there have been two types of Cloud-based authentication available to users. The first type of authentication stores all authentication information in the Cloud. This includes all user names, passwords and any other information necessary for user authentication. An entity will copy/synchronize its entire Active Directory (AD) onto the Cloud leaving the entity with little to no control over user authentication. The entity has put authentication for its users into the hands of the company managing the Cloud. Not only is this unnerving to the entity having a separate company managing its authentication, but the entity must worry about the Cloud being hacked and therefore all its authentication information stolen. The entity has lost all control over the security of its AD.

A second type of authentication scheme for the Cloud that is currently being utilized is to leave the AD on the client but open one or more inbound ports on the firewall so authentication requests can get through and reach the authentication servers. Clearly, the opening of inbound ports is not only burdensome but dangerous as the open ports can allow access to non-authorized people/entities.

In a world of well-known hacking of corporate, government and personal networks, there is a need to allow an entity to authenticate remote users of the entity's network without opening up the network to hackers and other security threats, and to allow secure access to the resources and data residing behind the firewall and within the corporate secure network.

SUMMARY

According to at least one embodiment of the present invention, a secure authentication method is provided allowing remote users desiring to access resources and the network of an entity, where those resources are behind the entity's firewall, the ability to securely authenticate with the entity's authentication servers without opening up the network to potential security breaches.

According to another embodiment of the present invention, a secure data and information access method is provided allowing remote users desiring to access data and information within an entity's firewall the ability to securely access the data and information without opening up the entity's network to potential security breaches.

According to a further embodiment of the present invention, a secure method is provided allowing remote users desiring to access computing resources on a computer or other digital device located within the entity's firewall the ability to access such computing resources without opening up the entity's network to potential security breaches.

Pursuant to the above embodiments, an entity installs a component of software on a machine or VM (virtual machine) that resides in a portion of the entity's network that can communicate with the entity's authentication servers, data and information, and computing resources. This software is called an "Agent." Under the current embodiment of the present invention, the agent in the entity network creates an outbound connection with one or more Cloud servers. On the Cloud server side, software is installed on computers within the Cloud servers and outside the entity's firewall. The software installed on the Cloud servers is to communicate with the Agent and is called the "Request Collector."

After the Agent and Request Collector have been installed, the Agent establishes an outbound connection to the Request Collector over a secure protocol/channel. Once the connection has been established, the Agent stays connected and waits for information to be rendered available by the Request Collector on the already-open channel. When a third party wants to authenticate with the entity and/or access data, information and/or resources within the entity's firewall, the third party sends its request to the Request Collector. The Requests Collector writes the request to the socket, or websocket, belonging to the already-open channel. The Agent reads the request from the already-open channel and has authority to decide whether the request should be served or not. If the Agent determines the request should be served, the Agent pulls the request from the Request Collector and executes the request locally, or in other words, on the resources within the firewall-protected network. Once the request has been carried out, the Agent will prepare a response and write it back to the Request Collector on the same already-open channel that the request was received. The response from the Agent may contain additional information. The Request Collector receives the response over the already-open channel from the Agent and renders the response available to the third-party which originally sent the request.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." "Fig" or "FIGs." herein) of which:

FIG. 1 illustrates an example of a system found in the present state of the art for authentication and data transfer in a Cloud environment.

DETAILED DESCRIPTION

Figure 2:
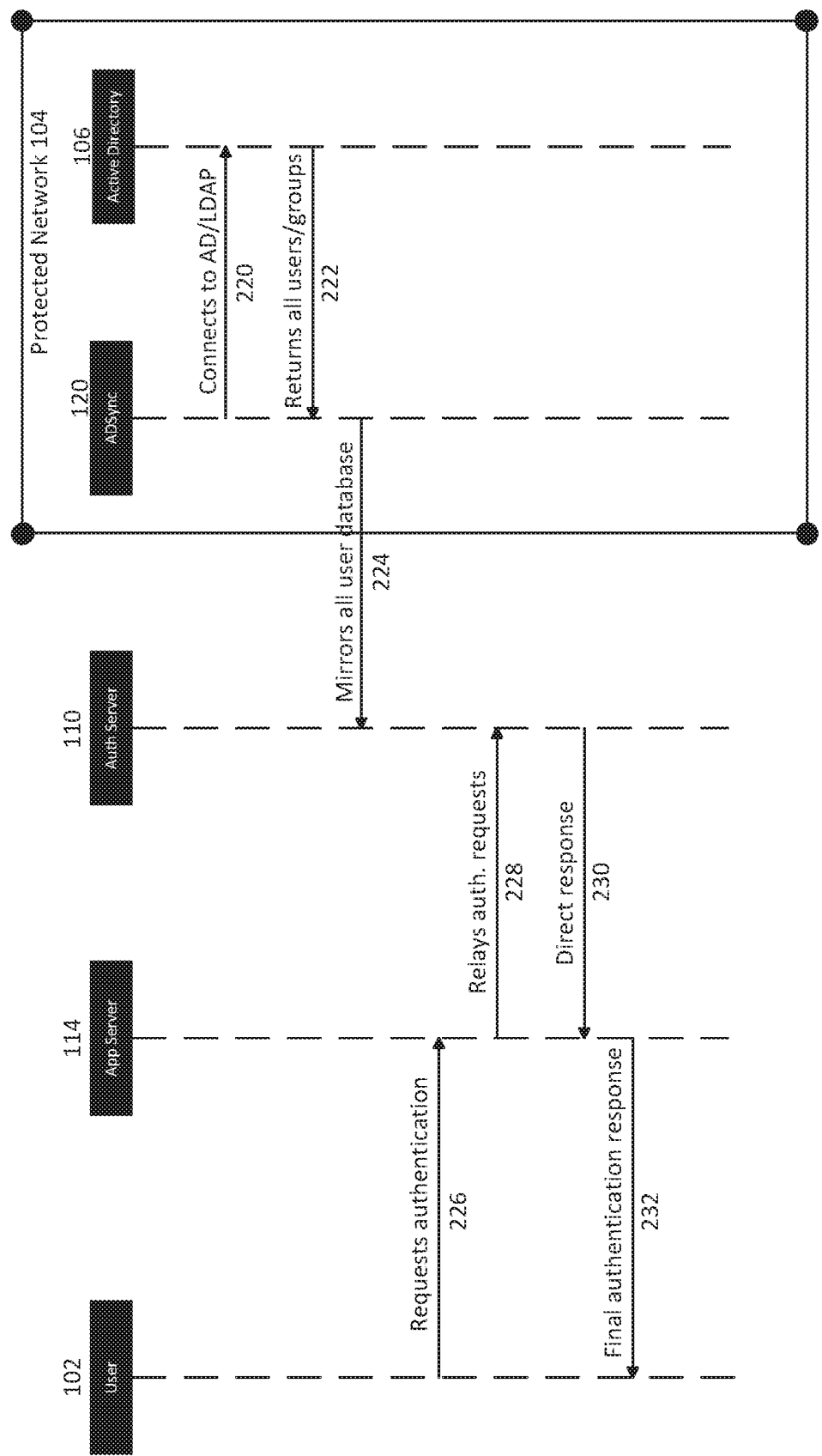
FIG. 2 illustrates a flow diagram supporting the example described by FIG. 1.

While some embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Throughout this specification the term "Corporate" is utilized with regards to a secure/protected network. It will be understood that "Corporate" is not limited to corporations but can apply to any businesses, small and personal entity environments/networks, nonprofit organizations, and governmental networks, none of which are to be limiting in scope to the utilization of the present invention.

FIG. 1 shows a diagram of a first authentication system of users accessing corporate information and systems in a Cloud environment as currently utilized in the art. Present-day systems follow essentially two different processes to allow remote users to access and utilize the resources and data contained within an entity's firewalled network. These processes are illustrated in FIGS. 1 through 4.

FIG. 1 shows a first system 100 which illustrates how a user presently may access an entity's firewalled network remotely through a Cloud environment. As shown, a user 102 desires to utilize systems or access data (not shown) of a protected network 104 pursuant to a first method. To allow the user access to the desired software tools and data, the user must first be authenticated by the system of protected network 104. A lightweight directory authentication protocol Active Directory (LDAP/AD) 106 (hereafter Active Directory 106) is situated behind a firewall 108 which is intended to protect protected network 104, including Active Directory 106 from outside intruders and hackers. As is understood in the art, Active Directory 106 is populated with user names, log-in credentials and passwords allowing users to authenticate who they are to protected network 104. Once authenticated, users can access and utilize tools and data available from protected network 104.

To authenticate user 102 under system 100 of FIG. 1, Active Directory 106 will store its data onto an authentication server 110 in Cloud 112. Active Directory synchronization software 120 (shown in FIG. 2) will, from time to time, synchronize the information stored on Active Directory 106 with authentication server 110 to keep authentication server 110 up-to-date.

Referring now to FIG. 2 in conjunction with FIG. 1, the process starts by Active Directory synchronization software 120 connecting to Active Directory 106 (step 220), whereupon Active Directory 106 returns all users/groups to Active Directory synchronization software 120 (step 222). Active Directory synchronization software 120 then mirrors all user data (step 224) through firewall 108 onto Authentication server 110 in Cloud 112. User 102 then requests authentication (step 226) utilizing App server 114 which relays the request to authentication server 110 in Cloud 112 (step 228). As part of the authentication request, user 102's credentials have been mirrored to authentication server 110 allowing authentication server 110 to compare the credentials from user 102 with the authentication credentials received from Active Directory 106 and stored on authentication server 110. In this way, authentication server 110 determines if user 102 is authorized to utilize the tools and data that are available in Cloud 112 that belong to the entity of protected network 104. An authorization response is sent back to user 102 through App server 114 (steps 230 and 232). Upon authorization, user 102 can begin utilizing the resources and data that are stored in Cloud 112 from protected network 104.

The disadvantages of system 100 are that first, protected network 104 (and associated entity) loses control over the authentication process. The control for the authentication process is shifted to authentication server 110 in Cloud 112. Second, protected network 104 is no longer in control of the security for the authentication credentials. Rather, that security control has been shifted to authentication server 110. Any breach of security by an intruder or outside hacker of Cloud 112 and authentication server 110 leaves protected network 104 vulnerable because authentication credentials, data and resources of protected network 104 are compromised. Furthermore, the authentication server 110 and Cloud 112 are operated by a third party, normally a Cloud vendor, and the use of this method renders all authentication data, network data and resources available to such third party which might or might not be trusted.

Figure 3:
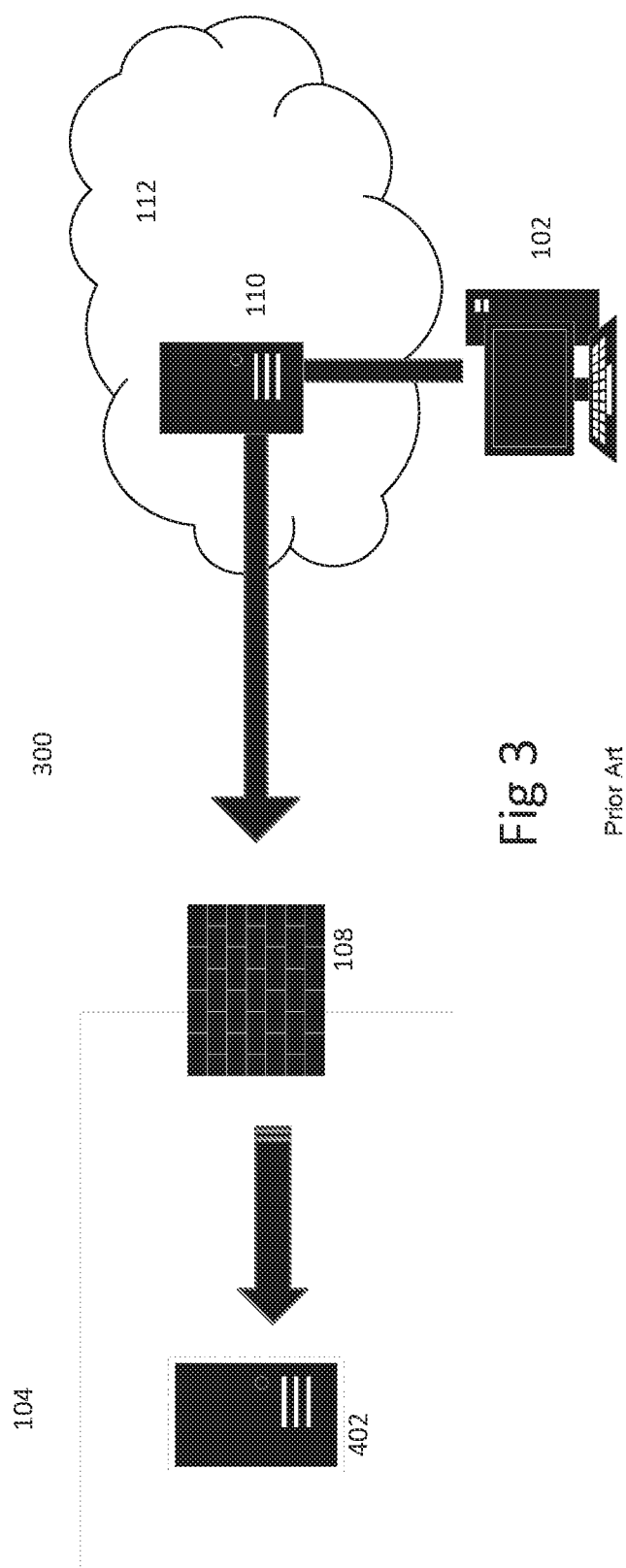
FIG. 3 illustrates another example of a system found in the present state of the art for authentication and data transfer in a Cloud environment.
Figure 4:
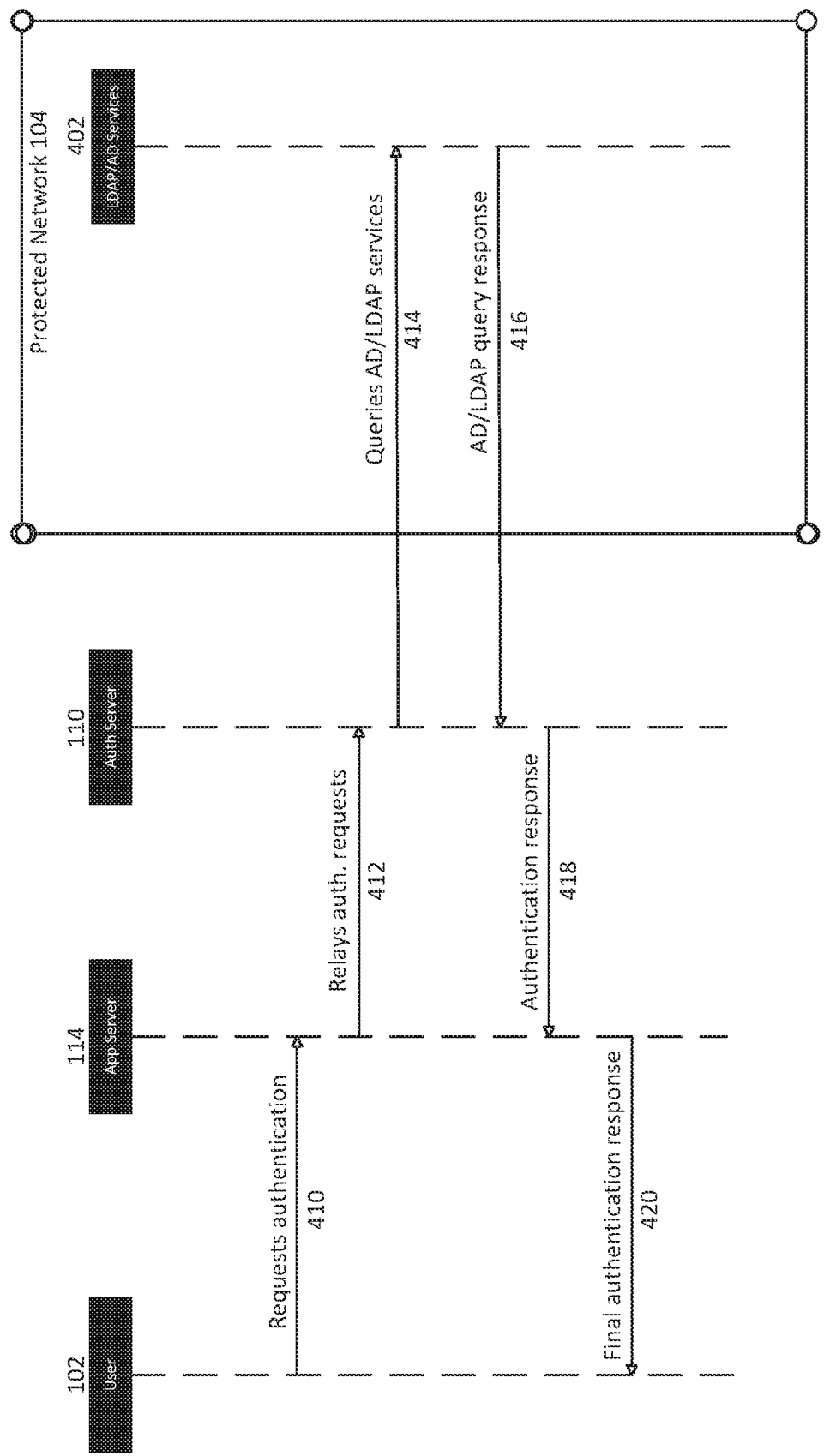
FIG. 4 illustrates a flow diagram supporting the example described by FIG. 3.

A second system in the present art for authentication and data/resources access systems of users accessing corporate information and systems in a Cloud environment is diagramed in FIGS. 3 and 4. FIG. 3 shows system 300 which is populated with similar elements as FIG. 1, namely protected network 104, App server 114 (FIG. 4), authentication server 110 in Cloud 112, firewall 108, and user 102. In system 300, Active Directory synch 120 and Active Directory 106 have been replaced with Active Directory services 402, which comprises one or more AD-enabled pieces of software. In operation, user 102 initiates an authentication request (step 410) through App server 114 which is then relayed to authentication server 110 in Cloud 112 (step 412). Authentication server 110 then queries Active Directory services 402 in protected network 104 for authentication approval (step 414) and a query response is returned to Authentication server 110 from Active Directory services 402 (step 416). In order to receive the authentication request, protected network 104 must have an open inbound port (not shown) through firewall 108 to allow inbound connections and communication. Thus, firewall 108 has not only a port (not shown) opened for outbound communication (step 416) from Active Directory 106 to user 102, but additionally has one or more inbound ports opened for authentication information coming from user 102 to Active Directory 106 pursuant to step 414. Completing the process, authentication server 110 sends an authentication response to App server 114 (step 418), and authentication server 110 sends this final authentication response to user 102 (step 420).

The disadvantage of system 120 is that now protected network 104 has opened up an incoming port directly towards or forwarded to Active Directory services 402 from outside of firewall 108. Open incoming ports may be open to hackers and intruders which "snoop" for openings within firewall 108 that allow access into protected network 104.

As outlined above, present-day methods for obtaining authentication, data and resources from a firewall-protected network through a Cloud system are inadequate to protect against hacking and stolen network information. The present invention, however, resolves these problems. The following descriptions are of various embodiments of the present invention. To more fully lay out an explanation of the present invention, two specific functions/examples will be described in detail. These two include authentication and data and resource transfer such as encryption key exchange/verification. Although the examples of the present invention include these two functions/examples, it should be recognized that the utilization of the present invention is not limited to these two functions/examples but can be utilized in many other and varied manners. Before describing the two specific functions/examples, the basic operation of the present invention shall be described.

Figure 5:
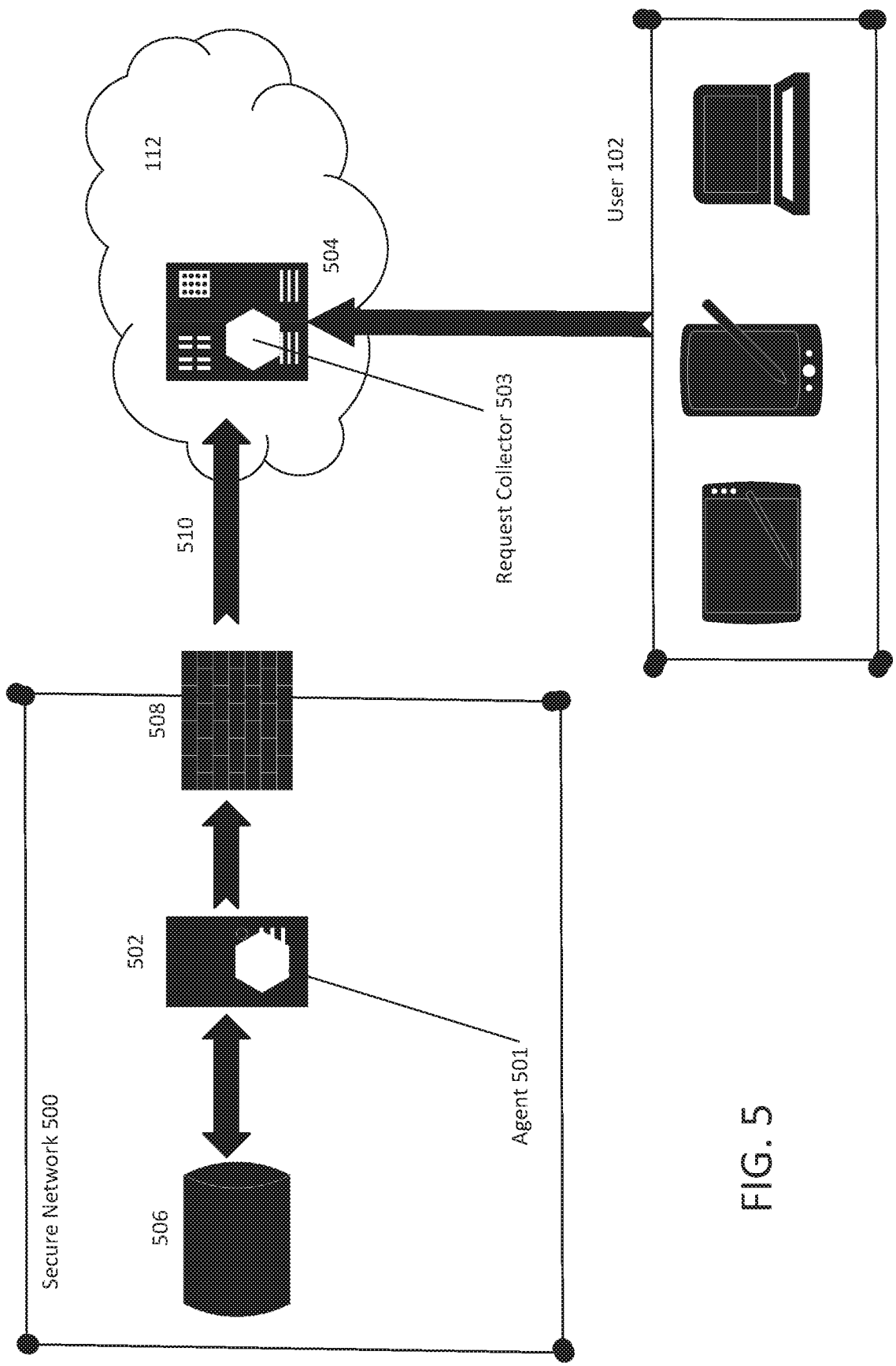
FIG. 5 illustrates an example of a system for secure communication, including data transfer and authentication, of users in a Cloud environment according to one embodiment of the present invention.

The basic operation of the present invention can be seen in FIG. 5. Specifically, a secure network 500 is shown having a firewall 508. It should be recognized that the present invention extends to protecting data, tools, resources and authentication in secure networks, such as corporate networks, but is not so limited and can be utilized in any secure environment connected to the internet where data, resources and authentication are to be remotely accessed. Secure network 500 is used as exemplary for the present invention.

Within secure network 500 is a computing device 502 upon which a software component has been installed. The software component, pursuant to the present invention, will be referred to hereafter as agent component or Agent 501. Computing device 502, when in operation pursuant to the present invention, is connected to computing device or Cloud server 504 in Cloud 112. Software, which pursuant to the present invention will be referred to hereafter as request collector component or Request collector 503, is a component installed on a computing device(s) or Cloud server 504 remote to secure network 500.

It should be understood that the present invention is not limited to a single Agent 501. Rather, multiple Agent 501 may be installed on computing device 502, and in the same manner, multiple computing device 502 having one or more Agent 501 are contemplated by the present invention. Agent 501 may be scaled linearly. Similarly, multiple Request Collector 503 may be installed on Cloud server 504, and in the same manner, multiple Cloud servers 504 with one or more Request collector 503 are contemplated by the present invention. For purposes of explanation, only one Agent 501 and one Request Collector 503 will be utilized in the following descriptions.

In operation, Agent 501 establishes an outbound connection through firewall 508 to Request Collector 503 over a secure protocol/channel 510. The secure protocol/channel 510 may comprise SSL, TLS, SSH, and/or secure websockets. It should be recognized that secure protocol/channel 510 is not limited to the listed secure channels but contemplates all secure channels. For instance, a websocket could be standardized by the IETF as RFC 6455 in 2011 and the Websocket API Web IDL standardized by W3C. This Websocket protocol supplies full-duplex channels thus allowing agent 501 to view requests and then issue responses as appropriate.

During this phase of the operation, agent 501 and request collector 503 may also verify each other's identity by employing the typical mutual verification methods like, for example, mutual X.509 certificate validation, or any other equivalent method to guarantee forward secrecy. Additionally, after secure channel 510 is established, agent 501 and request collector 503 may negotiate further encryption methods and keys to further encrypt traffic that will flow through secure channel 510.

Figure 6:
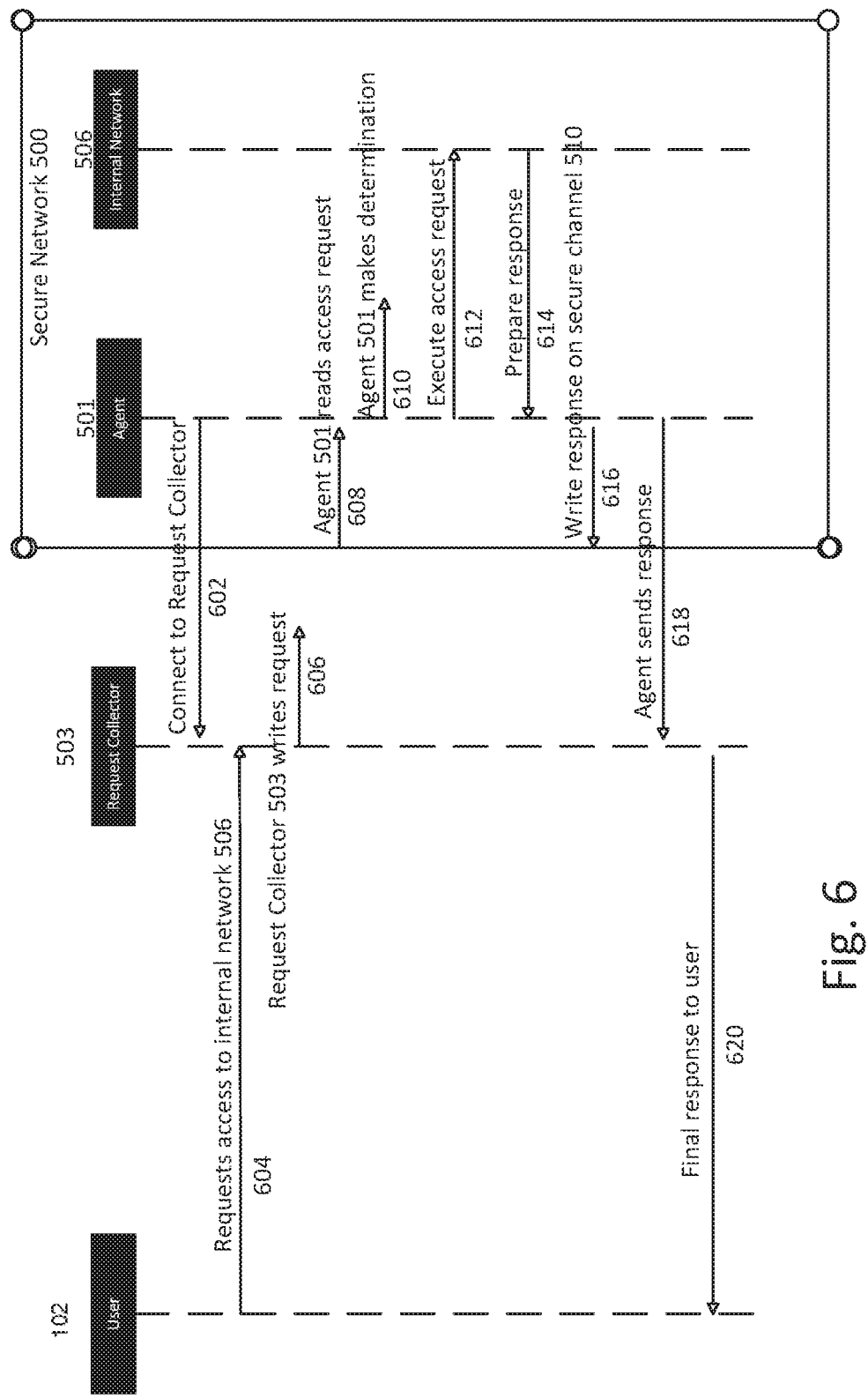
FIG. 6 illustrates an example of a flow diagram supporting the embodiment described pursuant to FIG. 5 according to the present invention.

Referring now to FIG. 6 in conjunction with FIG. 5, agent 501 on computing device 502 establishes, through firewall 508, an outbound connection to request collector 503 on Cloud server 504 (step 602). Instead of sending commands or requests, agent 501 stays connected to request collector 503 and waits for information to be inserted or rendered available on the already-opened secure channel 510 as shown by step 602 of FIG. 6. When a user 102 wants to access data, resources or authentication, etc., within secure network 500, such as from internal network 506, the user 102 sends a request to request collector 503 (step 604). It should be noted that user 102 can be a person, software, digital device, computer, or other entity and is not limited to the listed examples. Further, user 102 will generally connect to Cloud server 504 through the internet, although all methods of user 102 connecting with request collector 503 are contemplated by the present invention.

User 102 may access Cloud 112 through an application server (not shown) which would then relay the request to request collector 503. For purposes of this description, it will be assumed that user 102 sends the request directly to request collector 503.

Request collector 503 may, but does not necessarily need to, be equipped with a queue (not shown). Where there is a significant number of requests made to request collector 503, a queue would be helpful to assure a first-in-first-out tracking of all the requests. For purposes of the present description of the present invention, a queue will be assumed but not described further. Rather, only the request collector 503 will be described as an element of the process for purposes of this description, and not its parts.

At step 606, request collector 503 writes, or renders available, the access request from user 102 onto already-opened secure channel 510. At step 608, agent 501 reads the access request on already-opened secure channel 510. Agent 501 then makes a determination whether to accept or reject the access request (step 610). Agent 501 has the authority to make the determination.

If Agent 501 determines that the access request should be accepted, Agent 501 pulls the access request from already-opened secure channel 510 and causes the access request to be executed within the secure network 500 behind firewall 508 (step 612). Once the access request, which may be a data request, a request for resources in secure network 500, or authentication request, has been executed within secure network 500, Agent 501 prepares a response to the access request (step 614) and writes the response back on to the already-opened secure channel 510 (step 616). The response is then sent on the already-opened secure channel 510 to request collector 503 (step 618).

It should be noted that the response may contain varied information other than the data, resource response, and authentication. For instance, and not all inclusive, the response may include a result code that signifies error, an "unauthorized" access attempt, or any other condition.

Once request collector 503 receives the response, request collector 503 renders the response available to user 102 (step 620).

What is clear from the above description is that secure network 500 is never open to uninvited intrusion pursuant to the present invention. The only port that is open at firewall 508 is an out-going port opened by agent 501. Even request collector 503 never gains access through firewall 508 to secure network 500. Request collector 503 can only write a request on already-opened (by agent 501) secure channel 510 and wait for agent 501 to read the request and subsequently respond back to request collector 503 along already-opened secure channel 510. Secure channel 510 will always be a one-way communication going out from secure network 500. No incoming "holes" are "punched" through firewall 508. Additionally, data from secure network 500 is not copied into Cloud server 504 or other locations outside of secure network 500.

By utilizing the system and method described in conjunction with FIG. 5 and FIG. 6, resources such as tools, data and authentication for secure network 500 may be utilized by user 102 located in a remote location outside of secure network 500.

Reference will now be made to particular utilizations of the present invention.

Figure 7:
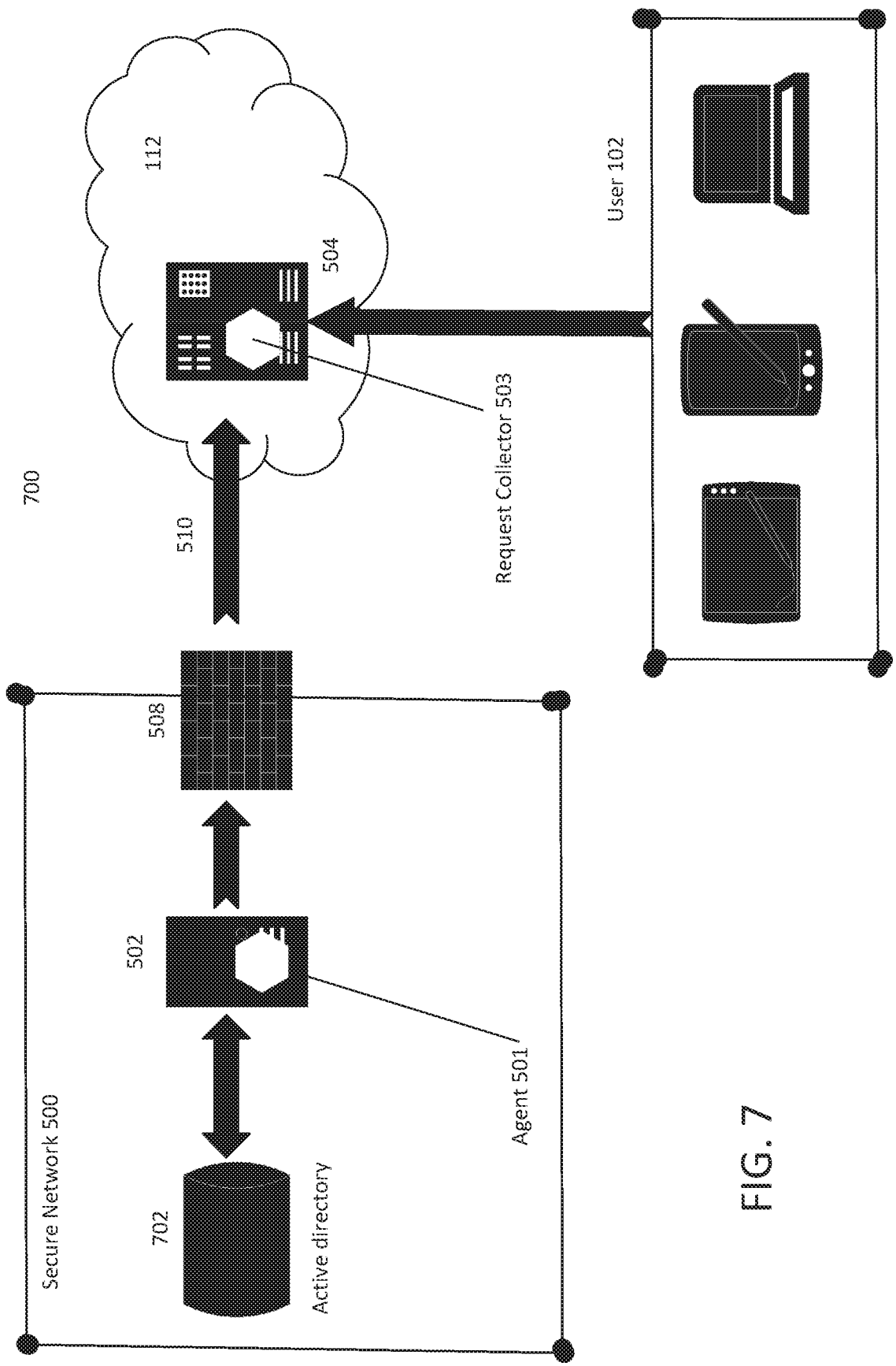
FIG. 7 illustrates an example of a system for authentication of users in a Cloud environment according to one embodiment of the present invention.
Figure 8:
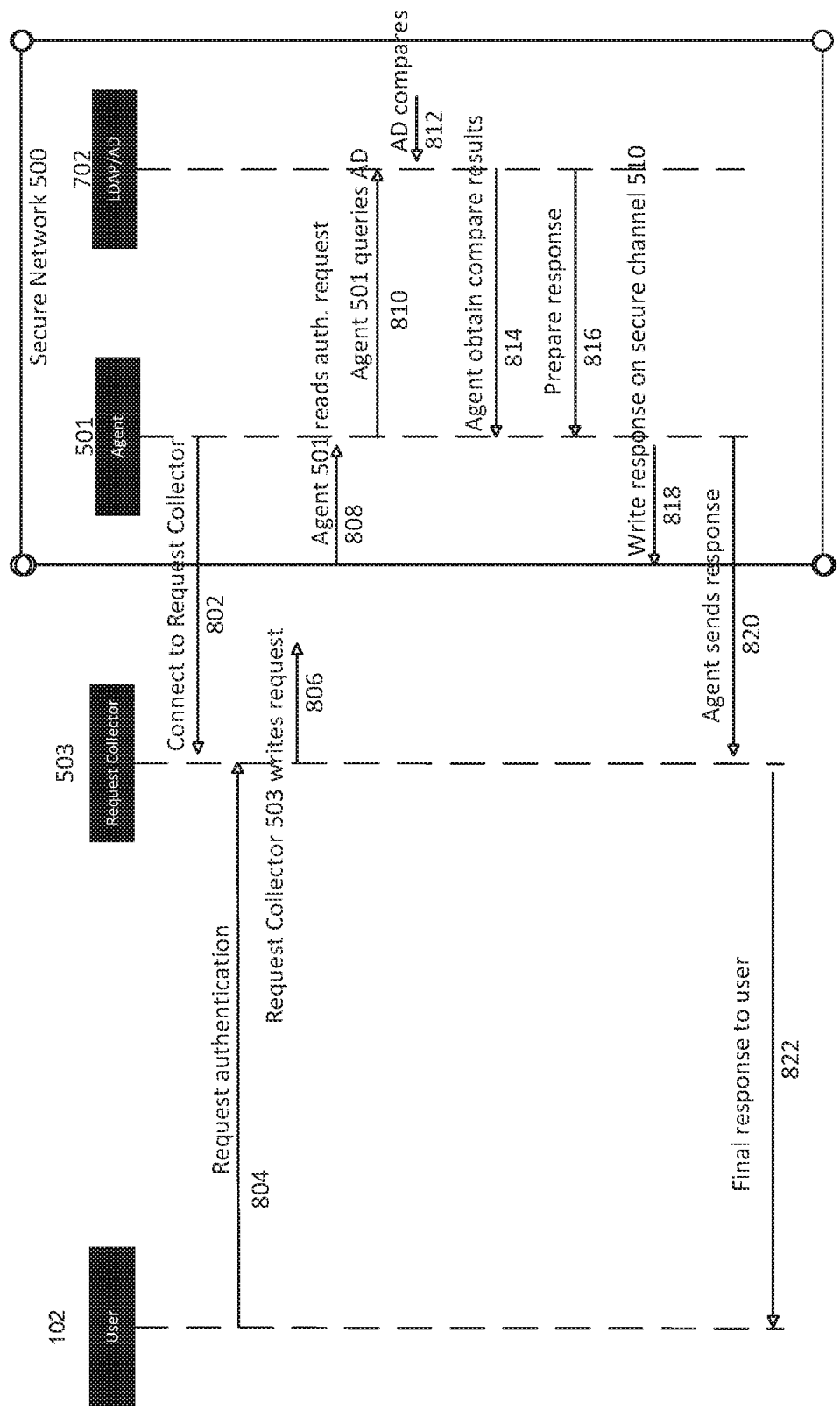
FIG. 8 illustrates an example of a flow diagram supporting the embodiment described pursuant to FIG. 7 according to the present invention.

Reference is now made to FIG. 7 and FIG. 8 to describe an authentication embodiment of the present invention. FIG. 7 shows a secure authentication system 700 according to this embodiment. In this embodiment, secure network 500, which is behind firewall 508, includes Active Directory 702 and computing device 502 having agent 501 installed therein. Additionally, Cloud 112 includes Cloud server 504 having request collector 503 installed therein.

Authentication occurs in a system when a user/entity, such as user 102, desires to access data and resources within a secure network such as secure network 500. Authentication confirms that user 102 may have access to secure network 500.

The operation of secure authentication system 700 will now be explained with reference to both FIG. 7 and FIG. 8. The process for authentication starts with agent 501 establishing an outbound connection through firewall 508 to request collector 503 over a secure protocol/channel 510 (step 802). As mentioned above, once agent 501 has connected along secure channel 510 (which is outbound only) with request collector 503, agent 501 maintains secure channel 510 open and waits for requests from request collector 503.

As mentioned above, secure protocol/channel 510 may comprise SSL, TLS, SSH, and/or secure websockets. It should be recognized that secure protocol/channel 510 is not limited to the listed secure channels but contemplates all secure channels as explained above. For instance, a websocket could be standardized by the IETF as RFC 6455 in 2011 and the Websocket API Web IDL standardized by W3C. This Websocket protocol supplies full-duplex channels thus allowing agent 501 to view authentication requests in queue from request collector 503 and issue authorization tokens as appropriate. While the above websocket is ideally suited for the present invention, other bidirectional communication protocols and products created pursuant to such protocols are also considered as part of the present invention.

When user 102 desires to access secure network 500, user 102 sends a request to request collector 503 (step 804). User 102 may access Cloud 112 through an application server (not shown) which would then relay the request to request collector 503. For purposes of this description, it will be assumed that user 102 sends the request directly to request collector 503.

As mentioned above, request collector will probably, but not necessarily, have a queue (not shown) to handle lots of requests. The queue, and other elements of request collector 503, will not be an element of the description of the present invention.

At step 806, request collector 503 writes the authentication request onto the already-opened secure channel 510. Agent 501 reads the authentication request as step 808.

Once agent 501 has read the authentication request on already-opened secure channel 510, agent 501 attempts to verify the actual identity of user 102 by querying Active Directory 702 (step 810) (an "operation execution" performed by agent 501). Active Directory 702 validates credentials received from user 102 included within user 102's request by comparing the user 102 credentials with data stored within Active Directory 702 (step 812). Agent 501 obtains the compare results (step 814) and uses the results of the comparison within Active Directory 702 pursuant to the operation execution to prepare a response to the request (step 816). The response is in a format that can be understood by user 102 and contains information to inform user 102 of the results of the executed authentication operation. If the authentication performed by Active Directory 702 failed, Agent 501 will prepare a response that comprises an error code and/or additional information about the failure. If the authentication was successful, the response will contain appropriate information for user 102 to access/utilize the data and resources of secure network 500.

At step 818 agent 501 writes the response to already-opened secure channel 510. At step 820 request collector obtains the response by reading the response from already-opened secure channel 510. At step 822 request collector returns the response to user 102.

It is noted that the queue of request collector 503 maintains requests from any number of users requesting authorization for access to the tools, data and services provided by secure network 500. All requests for authorization from Active Directory 702 pursuant to this embodiment of the present invention will follow the procedure outlined for system 700 above.

As noted above, the connection through firewall 508 between agent 501 and request collector 503 is only an outbound connection from secure network 500 utilizing only an outbound port through firewall 508. An outbound connection between agent 501 and request collector 503 means that any hacker or intruder looking for access into secure network 500 will not find any inbound open ports to Active Directory 702. The significance of this is that an intruder or hacker must have an inbound connection into secure network 500 through an inbound port of firewall 508 in order to access secure network 500 without having correct authentication credentials, or in other words, without having approval from secure network 500.

As mentioned previously, request collector 503 maintains a list of all authentication requests that are received for authentication in a queue. Request collector 503 has no capability to forward the requests on to agent 501 through firewall 508. However, the outbound channel (secure channel 510) established from agent 501 through firewall 508 to request collector 503 allows agent 501 to view all authentication requests stored or in the queue of request collector 503. This operates similar to a peep hole in a door allowing a party inside a room to see who is standing outside the room by the door. The outbound channel allows agent 501 to view all entries in the queue of request collector 503. Agent 501 can then scrutinize the list and determine which of the requests to try and authenticate.

It is important to understand that agent 501 proactively establishes the outbound channel on secure channel 510 with request collector 503 and proactively checks the requests in the queue. The only functions request collector 503 performs in the authentication process is 1) collecting and storing in a queue all the requests that are received from user 102 for authentication for secure network 500, and 2) accepting a response that comes from agent 501 through already-opened secure channel 510.

Figure 9:
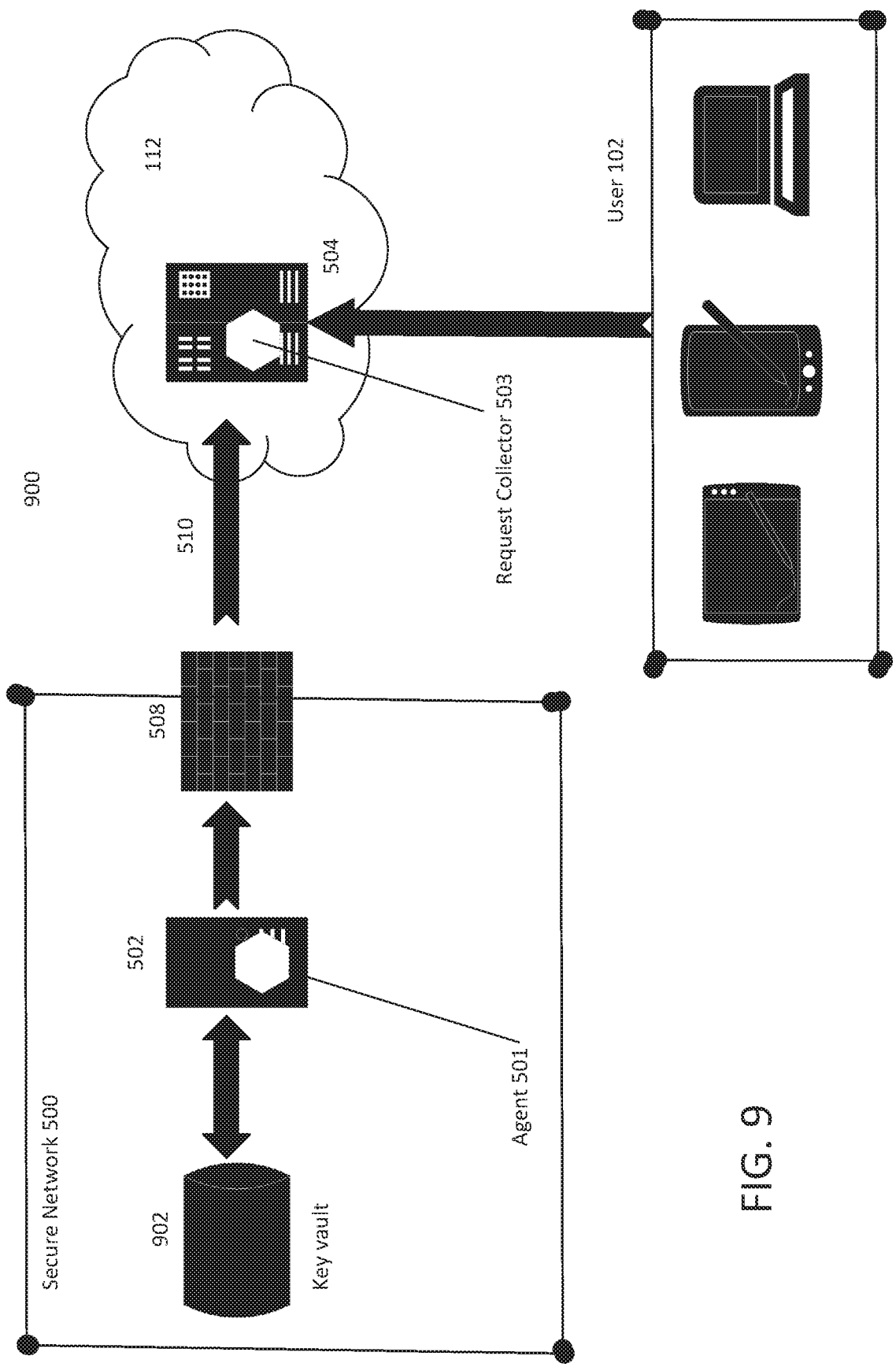
FIG. 9 illustrates an example of a system for data extraction from a secure network, and in particular, of encryption key extraction, of users in a Cloud environment according to one embodiment of the present invention.

A second example of the present invention will now be described. User 102 may seek data, such as encryption keys, stored in a key vault residing within secure network 500. FIG. 9 shows an embodiment, system 900, of the present invention wherein user 102 accesses data, and in particular, encryption keys from secure network 500.

Figure 10:
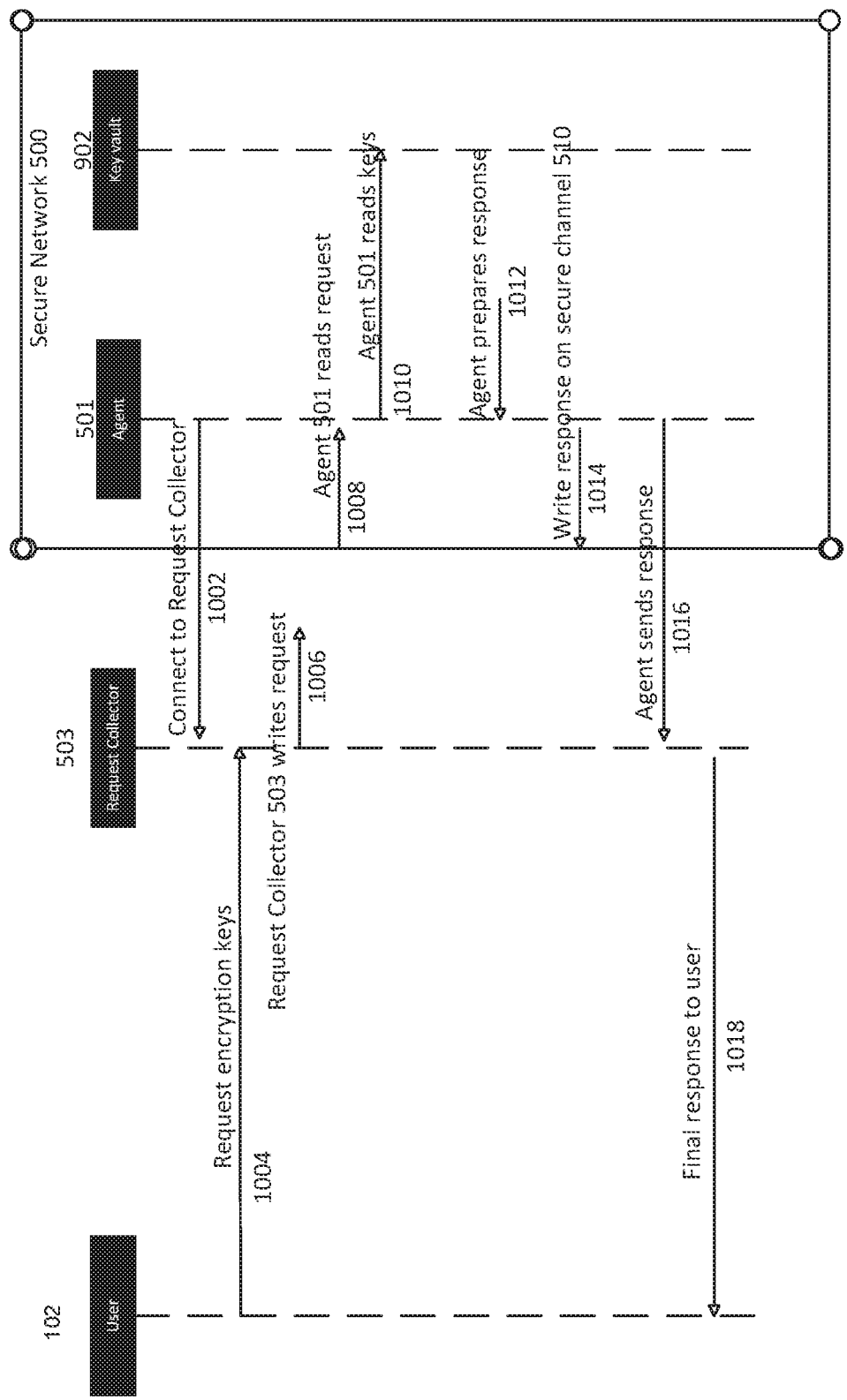
FIG. 10 illustrates an example of a flow diagram supporting the embodiment described pursuant to FIG. 9 according to the present invention.

Pursuant to this embodiment, a key vault 902 is located within secure network 500 and coupled to agent 501. This embodiment operates similar to that of the authorization embodiment described above. Namely, and with reference to FIG. 9 and FIG. 10, the process for retrieving data, and in this particular example, encryption keys, starts with agent 501 establishing an outbound connection through firewall 508 to request collector 503 over a secure protocol/channel 510 (step 1002). As mentioned above, once agent 501 has connected along secure channel 510 (which is outbound only) with request collector 503, agent 501 maintains secure channel 510 open and waits for requests from request collector 503.

As described above, the secure protocol/channel 510 may comprise SSL, TLS, SSH, and/or secure websockets. It should be recognized that secure protocol/channel 510 is not limited to the listed secure channels but contemplates all secure channels as explained above. For instance, a websocket could be standardized by the IETF as RFC 6455 in 2011 and the Websocket API Web IDL standardized by W3C. This Websocket protocol supplies full-duplex channels thus allowing the agent 501 to view authentication requests in queue from request collector 503 and issue authorization tokens as appropriate. While the above websocket is ideally suited for the present invention, other bidirectional communication protocols and products created pursuant to such protocols are also considered as part of the present invention.

It should be further noted that in all embodiments of the invention, agent 501 and request collector 503 are both scalable and multiples of each can be installed in their respective servers as described above.

When user 102 desires to access secure network 500 for data, and in this embodiment, access encryption keys, user 102 sends a request to request collector 503 (step 1004). User 102 may access Cloud 112 through an application server (not shown) which would then relay the request to request collector 503. For purposes of this description, it will be assumed that user 102 sends the request directly to request collector 503.

As mentioned above, request collector 503 will probably, but not necessarily, have a queue (not shown) to handle lots of requests. The queue, and other elements of request collector 503, will not be an element of the description of the present invention.

At step 1006, requests collector 503 writes the data/encryption key request onto the already-opened secure channel 510. Agent 501 reads the data/encryption key request as step 1008.

Once agent 501 has read the data/encryption key request on already-opened secure channel 510, agent 501 reads the appropriate encryption key from key vault 902 (step 1010) (a "data access" performed by agent 501). Agent 501 uses the result of reading the data/encryption key to prepare a response to the request (step 1012).

At step 1014 agent 501 writes the response to already-opened secure channel 510. At step 1016 request collector 503 obtains the response by reading the response from already-opened secure channel 510. At step 1018 request collector returns the response to user 102.

It is noted that the queue of request collector 503 maintains requests from any number of users requesting tools, data and services provided by secure network 500. All requests for data/encryption keys from key vault 902 pursuant to this embodiment of the present invention will follow the procedure outlined for system 900 above.

As noted above, the connection through firewall 508 between agent 501 and request collector 503 is only an outbound connection from secure network 500 utilizing only an outbound port through firewall 508. An outbound connection between agent 501 and request collector 503 means that any hacker or intruder looking for access into secure network 500 will not find any inbound open ports to Active Directory 702. The significance of this is that an intruder or hacker must have an inbound connection into secure network 500 through an inbound port of firewall 508 in order to access secure network 500 without having approval from secure network 500.

As mentioned previously, request collector 503 maintains a list of all requests that are received in a queue. Request collector 503 has no capability to forward the requests on to agent 501 through firewall 508. However, the outbound channel established from agent 501 through firewall 508 to request collector 503 allows agent 501 to view all requests stored in the queue of request collector 503. The outbound channel allows agent 501 to view all entries in the queue of request collector 503. Agent 501 can then scrutinize the list and determine which of the requests to accommodate.

As mentioned above with regards to the authentication example, it is important to understand that agent 501 proactively establishes the outbound channel on secure channel 510 with request collector 503 and proactively checks the requests in the queue. The only functions request collector 503 performs in the authentication process is 1) collecting and storing in a queue all the requests that are received from user 102 for authentication for secure network 500, and 2) accepting a response that comes from agent 501 through already-opened secure channel 510.

Figure 11:
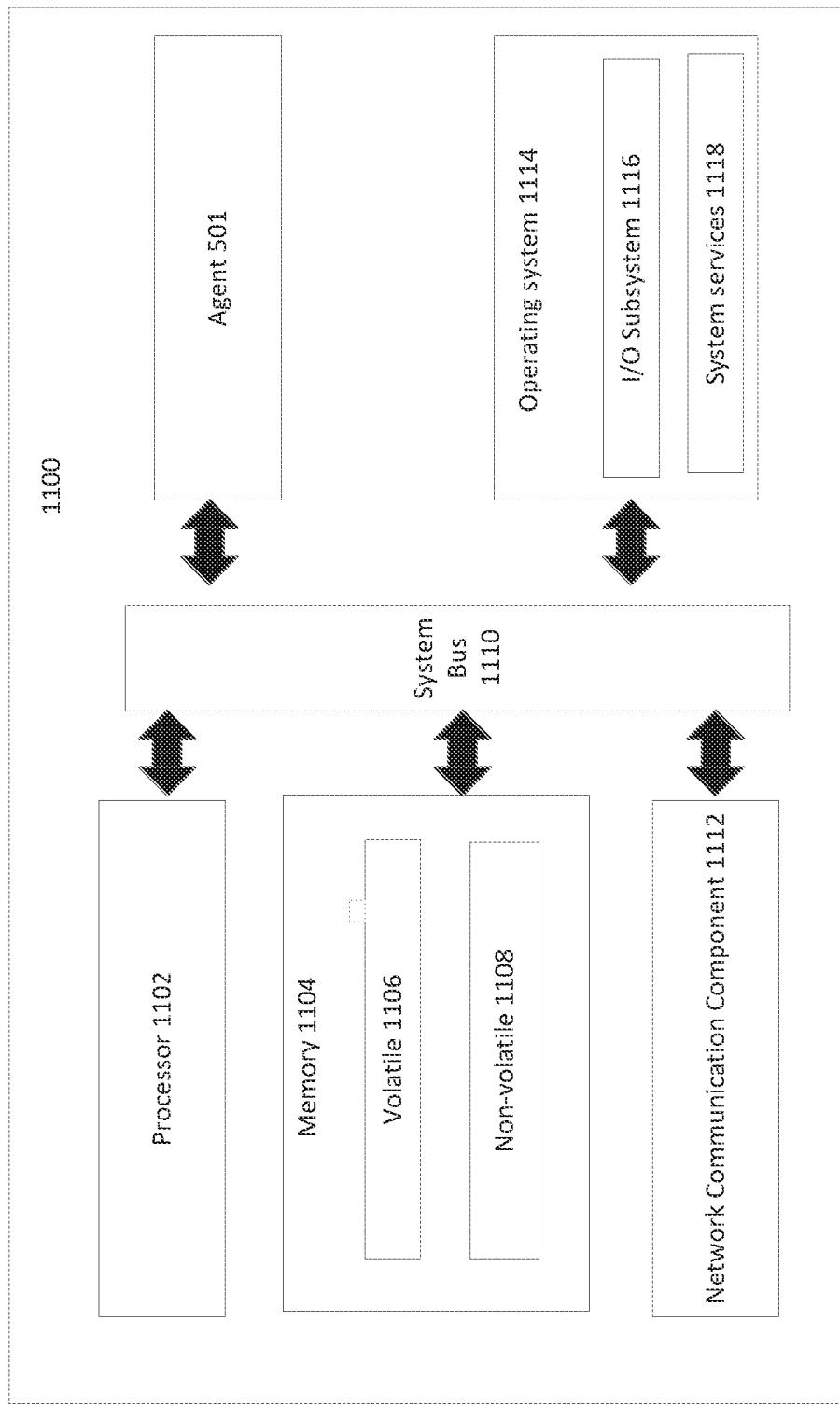
FIG. 11 is a block diagram illustrating an exemplary computing device which can be utilized within the present invention.

Turning to FIG. 11, FIG. 11 is a block diagram illustrating an exemplary user computing device suitable for use as computing device 502 pursuant to the present invention. Exemplary user computing device 1100 includes one or more processors (or processing units), such as processor 1102, and a memory 1104. The processor 1102 and memory 1104, as well as other components, are interconnected by way of a system bus 1110. The memory 1104 typically (but not always) comprises both volatile memory 1106 and non-volatile memory 1108. Volatile memory 1106 retains or stores information so long as the memory is supplied with power. In contrast, non-volatile memory 1108 is capable of storing (or persisting) information even when a power supply is not available. Generally speaking, RAM and CPU cache memory are examples of volatile memory 1106 whereas ROM, solid-state memory devices, memory storage devices, and/or memory cards are examples of non-volatile memory 1108. As will be readily appreciated, exemplary user computing devices include, by way of illustration and not limitation, tablet computers, laptop computers, desktop computers, smart phones, so-called phablets (hybrid smart phone-tablet computing devices), personal digital assistants, and the like.

The processor 1102 executes instructions retrieved from the memory 1104 (and/or from computer-readable media) in carrying out various functions such as those described above. The processor 1102 may be comprised of any of a number of available processors such as single-processor, multi-processor, single-core units, and multi-core units.

Further still, the illustrated user computing device 1100 includes a network communication component 1112 for interconnecting this computing device with other devices and/or services over a computer network. The network communication component 1112, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 1112, is typically comprised of hardware and/or firmware components (and may also include or comprise executable software components) that transmit and receive digital and/or analog signals over a transmission medium.

Further still, the exemplary user computing device 1100 also includes an operating system 1114 that provides functionality and services on the computing device. These services include an I/O subsystem 1116 that comprises a set of hardware, software, and/or firmware components that enable or facilitate inter-communication between a user of the computing device 1100 and the processing system of the computing device 1100. Indeed, via the I/O subsystem 1116 a computer operator may provide input via one or more input channels such as, by way of illustration and not limitation, touch screen/haptic input devices, buttons, pointing devices, audio input, optical input, accelerometers, and the like. Output or presentation of information may be made by way of one or more of display screens (that may or may not be touch-sensitive), speakers, haptic feedback, and the like. As will be readily appreciated, the interaction between the computer operator and exemplary computing device 1100 is enabled via the I/O subsystem 1116 of the user computing device. Additionally, system services 1118, provide additional functionality including location services, interfaces with other system components such as the network communication component, and the like. Agent 501 is a further component of exemplary computing device 1100 pursuant to the present invention.

In certain embodiments, each of the various components of exemplary computing device 1100 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network.

Aspects of the present invention may be implemented on other computing devices and/or distributed on multiple computing devices. Further, the aspects of the present invention may be implemented as computer-executable instructions stored by computer-readable media, also referred to as computer-readable storage media. As those skilled in the art will recognize, computer-readable media can host computer executable instructions for later retrieval and execution. When the computer-executable instructions stored on the computer-readable storage devices are executed, they carry out various steps, methods and/or functionality, including those steps, methods and routines described above. Examples of computer-readable media include, but are not limited to: optical storage media such as Blu-ray discs, digital video discs (DVDs), compact discs (CDs), optical disc cartridges, and the like; disks, magnetic tape, and the like, memory storage devices such as random access memory (RAM), read-only memory (ROM), memory cards, thumb drives, and the like. For purposes of this disclosure, however, computer-readable media expressly excludes carrier waves and propagated signals.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A method for a remote user to access resources within a secure network, the method comprising:
   opening, by an agent stored on a first computing device within the secure network, an outbound secure channel through a firewall of the secure network, the outbound secure channel opened to access a request collector stored on a second computing device outside the secure network;
   waiting, by the agent, until the request collector has rendered available to the outbound secure channel a request from the remote user outside the secure network for access to the resources in the secure network, wherein the request collector can render the request available to the outbound secure channel but has no capability to forward the request to the agent;
   reading, by the agent, the request rendered available to the outbound secure channel by the request collector;
   the agent causing the request to be executed utilizing the resources within the secure network; and
   responding back, by the agent to the request collector on the outbound secure channel, a response to the request.

2. The method according to claim 1 wherein the agent opens the outbound secure channel through an outbound port but does not open any inbound ports for use by the request collector.

3. The method according to claim 1 wherein opening by the agent the outbound secure channel comprises opening a websocket supplying full-duplex channels.

4. The method according to claim 1 wherein the agent queries an Active Directory to validate credentials of the user received in the request upon receiving the request.

5. The method according to claim 1 wherein the agent obtains data from the secure network upon receiving the request.

6. The method according to claim 1 wherein the agent reads appropriate encryption keys from a key vault residing within the secure network upon receiving the request.

7. The method according to claim 1 wherein the request collector resides in a cloud environment.

8. A system for a remote entity to access resources within a secure network, the system comprising:
   at least one computing device within the secure network, the at least one computing device having at least one agent component stored thereon;
   at least one remote computing device outside the secure network, the at least one remote computing device having at least one request collector component stored thereon; and
   a firewall of the secure network, the at least one agent component opening an outbound secure channel through the firewall of the secure network to access the at least one request collector component but does not open any inbound ports for use by the at least one request collector;
   wherein an operation of the system comprises:
      the at least one request collector component renders available to the outbound secure channel, but has no capability to forward to the at least one agent component, a request from the remote entity outside the secure network for access to resources in the secure network;
      wherein the at least one agent component reads the request rendered available on the outbound secure channel;
      the at least one agent component causes the request to be executed utilizing the resources within the secure network; and
      the at least one agent component sends to the at least one request collector component on the outbound secure channel a response to the request.

9. The system according to claim 8 wherein the at least one remote computing device is located within a cloud environment.

10. The system according to claim 8, the system further comprising an Active Directory having authentication information stored therein and residing within the secure network.

11. The system according to claim 10 wherein the at least one agent component queries the Active Directory to validate credentials of the user received in the request.

12. The system according to claim 8 further comprising a key vault having encryption keys stored therein and residing within the secure network.

13. The system according to claim 12 wherein the at least one agent reads appropriate encryption keys from the encryption keys stored in the key vault.

14. The system according to claim 8 wherein the outbound secure channel is a websocket supplying full-duplex channels.

15. A computer-readable storage media storing computer-executable instructions which, when executed on a computing device including a processor for executing the instructions, carry out a method for a remote user to access resources within a secure network, the method comprising:
   opening, by an agent stored on a computing device within the secure network, an outbound secure channel through a firewall of the secure network, the outbound secure channel opened to access a request collector stored on a computing device outside the secure network;
   waiting, by the agent, until the request collector has rendered available on the outbound secure channel a request from the remote user outside the secure network for access to the resources in the secure network, wherein the request collector can render the request available on the outbound secure channel but has no capability to forward the request to the agent;
   reading, by the agent, the request rendered available on the outbound secure channel by the request collector;
   the agent causing the request to be executed utilizing the resources within the secure network; and responding back, by the agent to the request collector on the outbound secure channel, a response to the request.

16. The computer-readable storage media according to claim 15 wherein the agent opens the outbound secure channel through an outbound port but does not open any inbound ports for use by the request collector.

17. The computer-readable storage media according to claim 15 wherein opening by the agent the outbound secure channel comprises opening a websocket supplying full-duplex channels.

18. The computer-readable storage media according to claim 15 wherein the agent queries an Active Directory to validate credentials of the user received in the request upon receiving the request.

19. The computer-readable storage media according to claim 15 wherein the agent obtains data from the secure network upon receiving the request.

20. The computer-readable storage media according to claim 15 wherein the agent reads appropriate encryption keys from a key vault residing within the secure network upon receiving the request.

* * * * *